Feb. 17, 1931.  J. BORNSTEIN  1,793,354
WINDSHIELD WIPER
Filed Aug. 3, 1927  4 Sheets-Sheet 1
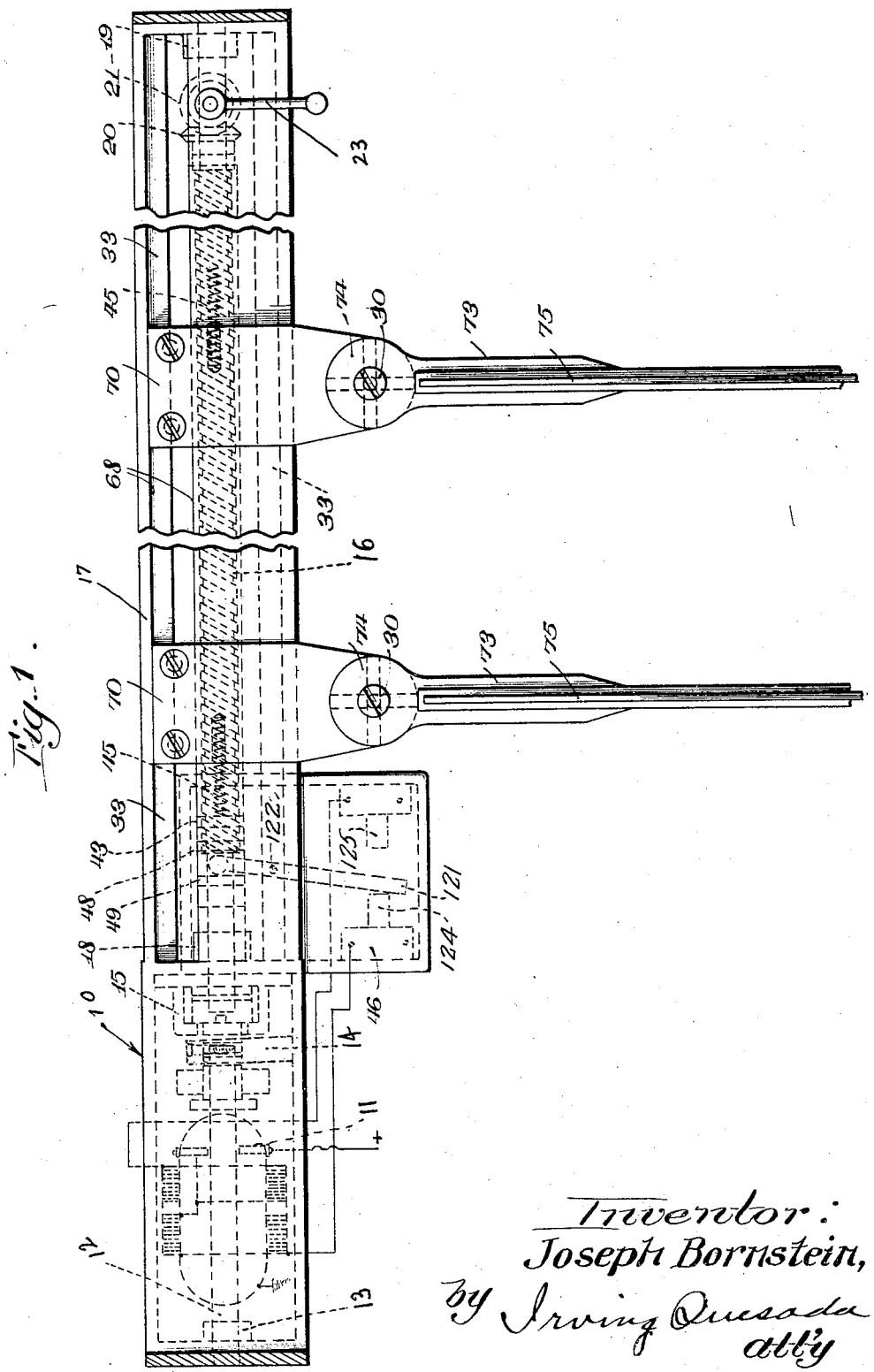
Inventor:
Joseph Bornstein,
by Irving Quesada
att'y

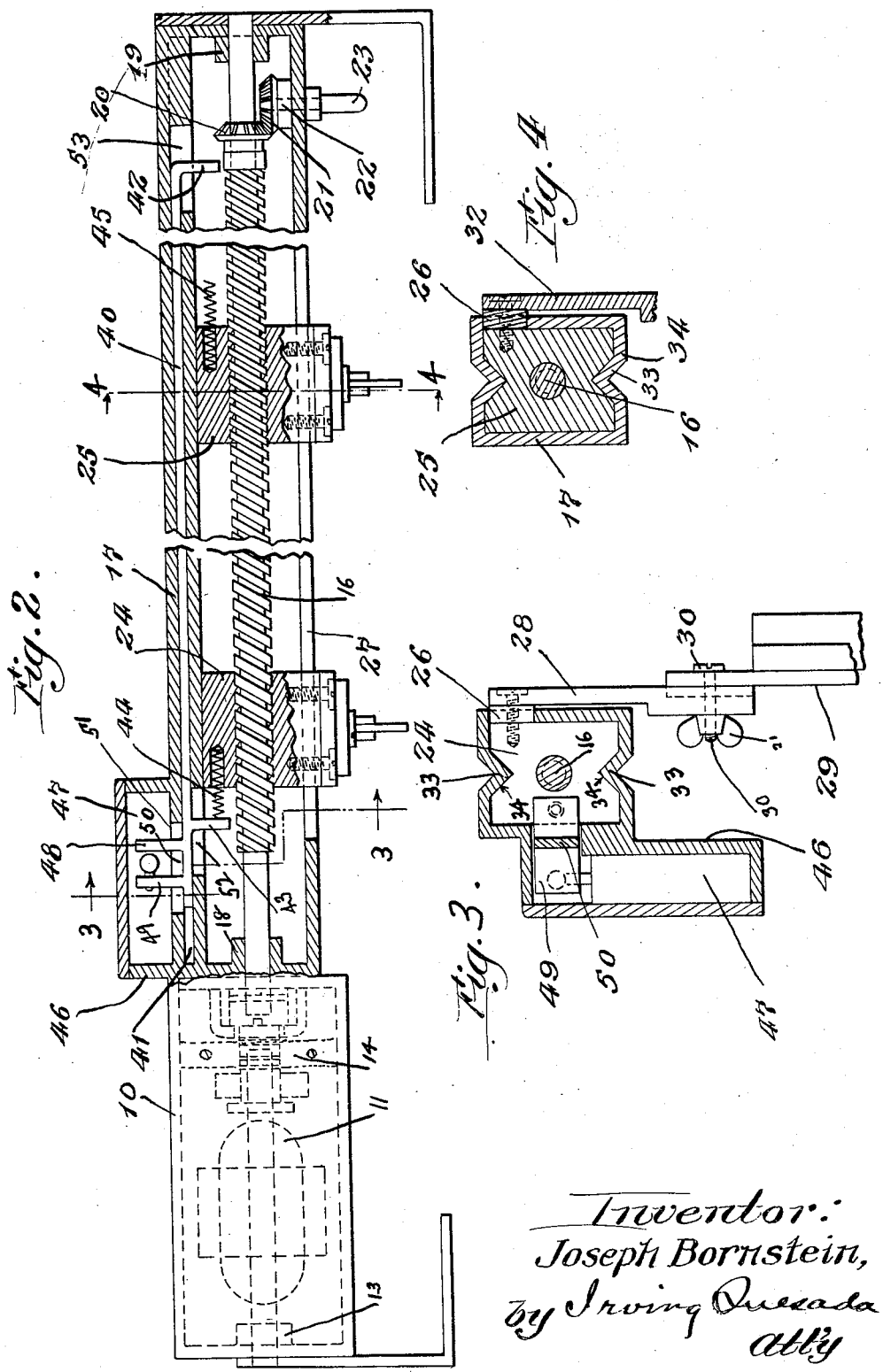

Feb. 17, 1931. J. BORNSTEIN 1,793,354
WINDSHIELD WIPER
Filed Aug. 3, 1927 4 Sheets-Sheet 3
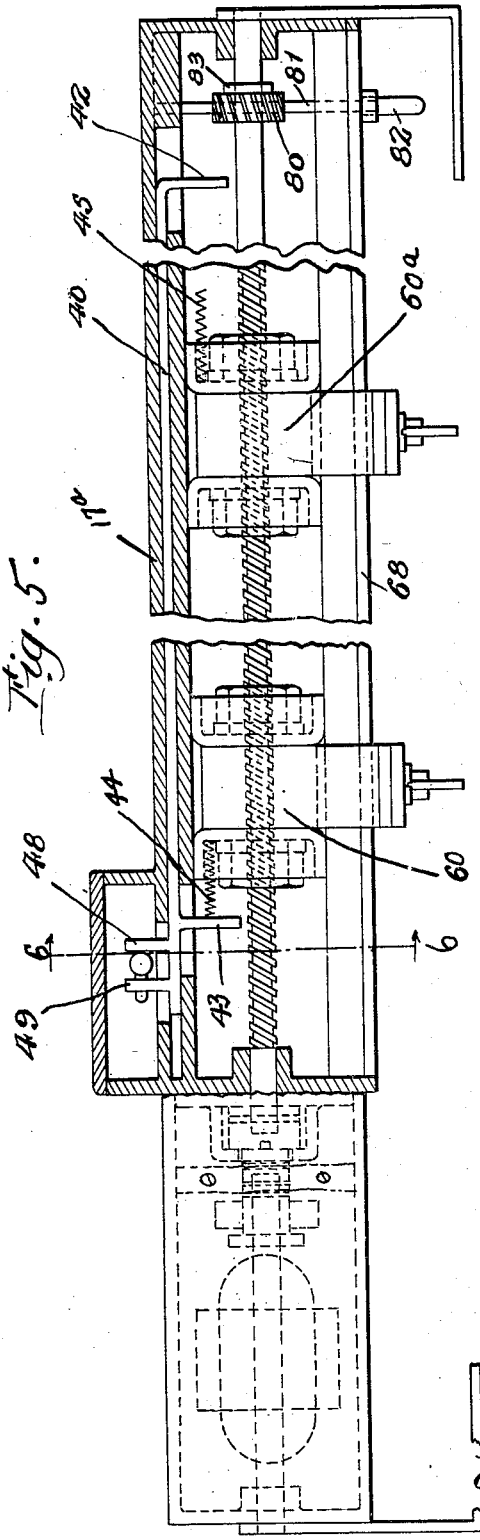
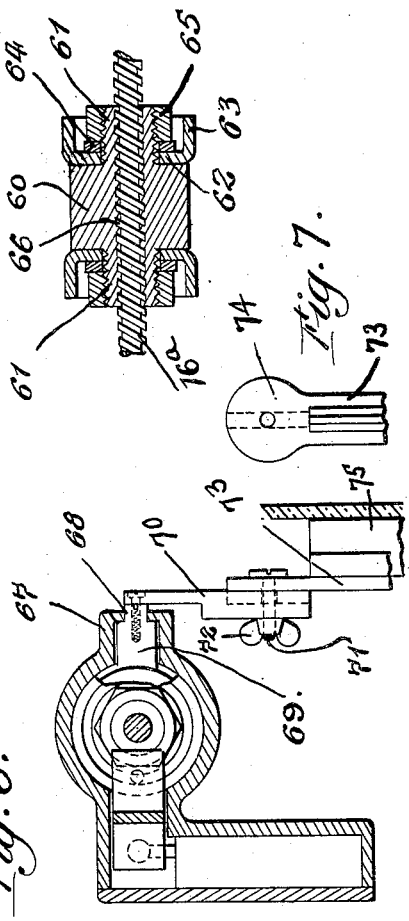
Inventor:
Joseph Bornstein,
by Irving Quesada
atty.

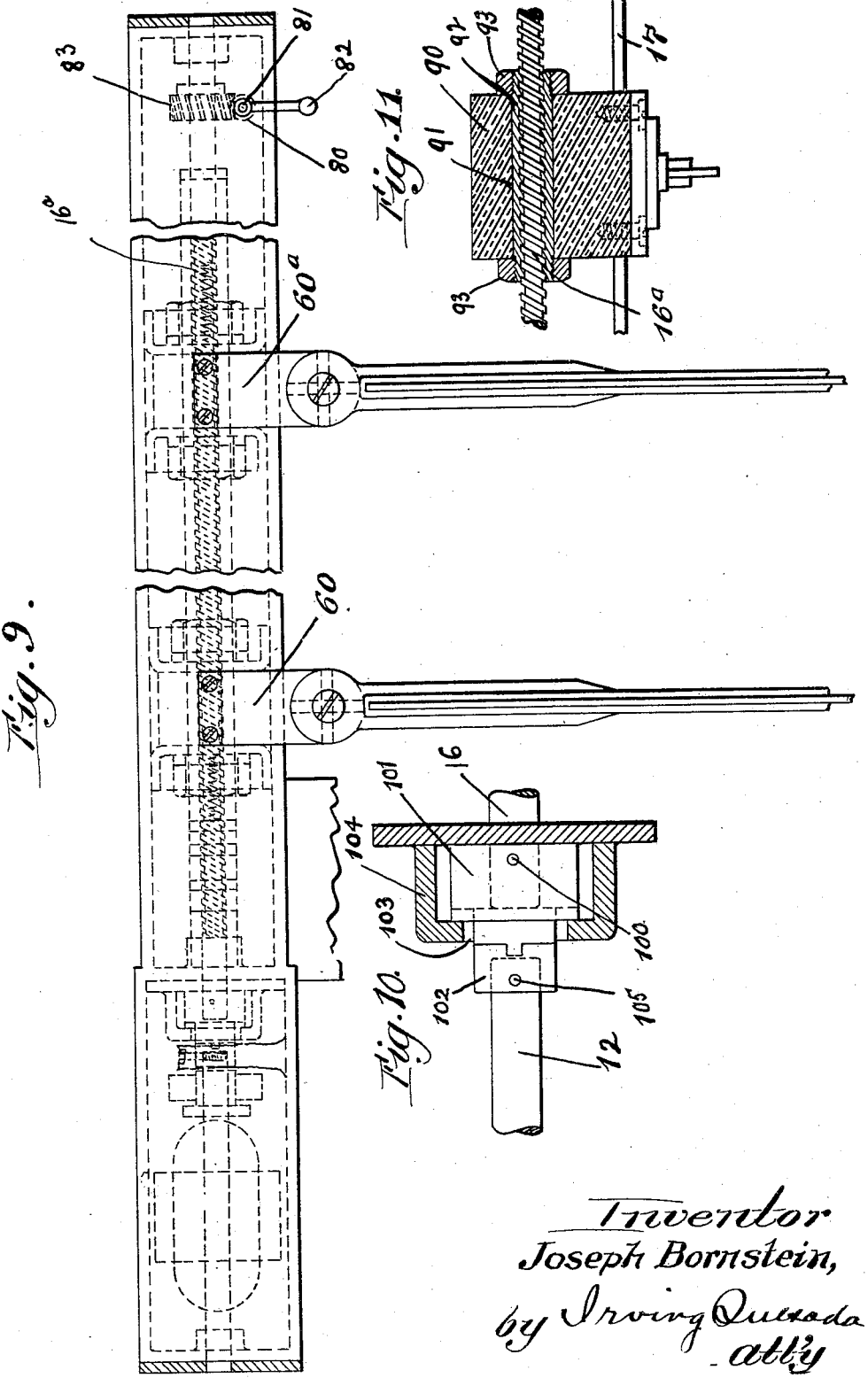

Patented Feb. 17, 1931

1,793,354

UNITED STATES PATENT OFFICE

JOSEPH BORNSTEIN, OF DORCHESTER, MASSACHUSETTS, ASSIGNOR, BY DIRECT AND MESNE ASSIGNMENTS, TO SOMBCO, INC., OF BOSTON, MASSACHUSETTS, A CORPORATION OF MASSACHUSETTS

WINDSHIELD WIPER

Application filed August 3, 1927. Serial No. 210,402.

This invention relates to a windshield wiper of the rectilinear type.

It has been proposed to operate a wiper longitudinally of a windshield by a screw and nut but due to the fact that a screw of great length is required to provide for a rectilinear motion of the wiper across the entire length of the windshield, it is difficult to furnish the necessary bearing surfaces to prevent buckling, slap, or vibration of the screw so that in time the wiper will tend to stick and will not operate without noise.

An object of the present invention is the provision of a mechanism for causing a rectilinear motion of wipers in which a plurality of nuts are moved at equal speeds by a screw and in complementary relation so that all vibration and distortion of the screw is prevented.

Another object of the invention is the provision of a windshield wiper in which a plurality of squeegees are moved in a rectilinear motion across a windshield by a screw and a plurality of nuts with the nuts serving as bearings at points which are equally spaced at all times so that springing or vibration of the screw is eliminated.

A further object of the invention is the provision of a windshield wiper in which a plurality of wiper carriers in the form of nuts are moved in cooperative relation in a channel, each being adapted at the end of its outward movement of travel to actuate a switch arm controlling a switch for reversing an electric motor whereby each nut or wiper carrier traverses approximately one half the length of the windshield, this action being particularly efficacious for clear vision during rain or snowstorm since two areas of the windshield in close proximity are always in the process of being cleaned.

A still further object of the invention is the provision of automatically and rectilinearly operated squeegees moving in cooperative relation across closely associated fields of vision of a windshield and in which manual means are operatively connected with the actuating instrumentality for the squeegees so that when the automatic means become ineffective the manual means may be brought into play.

Other objects and advantages of the invention will be fully understood from the following description and claim when the same are read in connection with the drawings, accompanying and forming part of my invention, in which:

In the drawings:

Fig. 1 is a view in elevation of a windshield wiper constructed according to the principles of my invention.

Fig. 2 is a horizontal section of the wiper shown in Fig. 1.

Fig. 3 is a transverse vertical section taken along the line 3—3 of Fig. 2.

Fig. 4 is a transverse vertical section taken along the line 4—4 of Fig. 2.

Fig. 5 is a fragmentary vertical longitudinal sectional view illustrating a modification of the invention.

Fig. 6 is a transverse vertical section taken along the line 6—6 of Fig. 5.

Fig. 7 is a fragmentary view in elevation of the wiper arm.

Fig. 8 is a horizontal section of a nut or wiper carrier.

Fig. 9 is a view in elevation of the modified form of windshield wiper shown in Fig. 5.

Fig. 10 is a vertical section of the connection between the motor shaft and screw.

Fig. 11 is a horizontal section of a modified form of nut or wiper carrier having an internally threaded metal sleeve and a non-metallic guiding block.

Referring more particularly to the drawings, 10 designates a housing for a motor 11 which has a shaft 12 mounted in bearings 13 and 14. This shaft has a connection at 15 with a screw 16 extending longitudinally of a housing 17. This housing is formed integrally or may be connected in any approved manner with the housing 10.

The screw 16 has a bearing at 18 at one end and a bearing 19 formed at the outer end of the housing 17. At the outer end of the screw is mounted a gear 20 meshing with a gear 21, the last mentioned gear being rigid with a shaft 22 and adapted to be manually operated by a crank 23.

A pair of spaced nuts 24 and 25 have a centrally threaded passage meshing with the screw 16 so that when the screws are revolved by the motor 11, the nuts will be moved longitudinally and in predetermined spaced relation within the housing 17. A spacing block 26 is secured to a nut and projects through a slot 27 formed longitudinally in one side of the housing 17. An arm 28 is secured to the block 26 and the nut 24 and is provided with a wiper arm 29 which may be adjusted relative to the arm 28 by means of a screw 30 and thumb nut 31. The threaded passages in the nuts may be located eccentrically instead of centrally if desired.

The nut 25 carries an arm 32 exteriorly of the housing 17 and the block 26 rides within the slot 27 spacing the arm 32 slightly from the inner face of the housing 17. Both of the nuts are maintained against rotation by means of oppositely disposed V-shaped depressions 33 slidable in grooves 34 in the nuts.

A rod 40 is slidably mounted within a groove 41 of the housing 17 and has depending arms 42 and 43 projecting towards the screw 16 and in the path of the moving nuts 24 and 25. A spring 44 carried by the nut 24 is adapted to engage the arm 43 and a coil spring 45 carried by the nut 25 and projecting outwardly therefrom is adapted to engage the arm 42.

Where the housing 17 is connected to the motor housing 10, an extension 46 is provided forming a chamber 47 into which projects a contact member 48 and is movable therein. A second contact member 49 is carried by the housing 17 and extends into the path of the movable contact 48. Said contact is disposed within a slot 50 in the rear wall of the housing 18 where said wall forms the inner wall of the extension 46.

It will be noted that the inner section 51 of the housing 17 is cut away at 52 to permit sliding of the arm 43, while the same section is cut away at 53 to permit sliding of the arm 42.

Figures 5 to 9 inclusive disclose a modified form of the nut and housing. In this case the nut 60 is formed of any suitable material which may be non-metallic, if preferred, for aiding in eliminating noise.

The opposite ends of the nut are reduced and threaded as shown at 61 to receive collars 62 having flanges 63 which abut the shoulders formed by the reduction of the opposite ends of the nut. A washer 64 is threaded on to the reduced end 61 and a nut 65 is threaded on to the reduced end and is forced into engagement with the washer 64. The nut has a central passage 66 which is internally threaded and engages the threads of a screw 16$^a$.

The housing 17$^a$ may be of any shape, but in this case I prefer to make the same cylindrical and form an extension 67 having a longitudinal channel 68 in which rides a lug 69 forming a lateral extension of the nut 60.

Secured to the outer projecting end of the lug 69 is an arm 70 which is perforated to receive a screw 71 and a lock nut 72 secures the wiper 73 to the arm 70. The portion 74 of the wiper arm is enlarged as shown in Figure 7 in order to provide sufficient frictional surface to maintain the arm against movement when the nut 72 has been properly adjusted. The wiper arm 73 carries a rubber member 75 which is moved in close contact with the surface of the windshield.

The contact members 48 and 49 are similar in all respects to the contact members shown in Figure 2 and the member 48 is carried by the reciprocating rod 40 which has the depending arms 42 and 43 adapted to be engaged by the coil springs 44 or 45 projecting outwardly from a nut 60 and 60$^a$.

A worm 80 on a shaft 81 is adapted to be rotated by a crank 82 and since it meshes with a worm gear 83, it will cause rotation of said worm gear and the screw 16$^a$.

A modified form of the nut is shown in Figure 11 in which a body member 90 is formed of non-metallic material which will aid in eliminating noise and which has a central passage 91 to receive a sleeve 92 which is retained against rotation by means of nuts 93 threaded on to the opposite ends of the sleeve and forced into engagement with the opposite ends of the body member 90. The sleeve 92 is internally threaded and meshes with the screw 16$^a$ so that rotation of the screw will cause rectilinear motion of the body member 90 when the nut is held against rotation. To this nut is secured the usual wiper arms having lugs, as has been previously explained, projecting through the elongated slot 27 in the housing 17.

Referring more particularly to Figure 10, it will be seen that an enlarged detail of the connections between the motor shaft 12 and the screw 16$^a$ is disclosed. The outer end of the screw 16 is pinned at 100 in a socket of a rotatable member 101. This member has a projection 102 inserted through an opening 103 of an auxiliary housing 104. The projection 102 has a socket to receive a pin 105 which secures the projection to the shaft 12.

The operation of my device is as follows:

When the motor 11 is energized and rotated, it will cause rotation of the screw 16 or 16$^a$ in one direction. At this time, the nuts 24 and 25 or 60 and 60$^a$ are moved in a rectilinear motion towards the right until the coil spring contacts with the lug or arm 42. When the pressure overcomes the tension of the spring 45 said lug is moved to the right, forcing the rod 40 in the same direction and causing the contact 48 to be moved away from the contact 49, thereby reversing the circuit to the motor, which in turn reverses its rotation and thereby causing a reverse revolution of the screw 16. The nuts 24 and 25 or 60 and 60ª are moved towards the left and when the spring 44 is compressed sufficiently to force the lug 43 to the left, said lug is moved and the contact 48 is shifted to contact engagement with the member 49. At this time the current is reversed and the motor is reversely operated for causing the screw to be revolved in the opposite direction whence the nuts are moved to the opposite end of the housing, and this alternating movement continues as long as the motor is energized.

It will be seen by this construction that the spaced nuts provide movable bearings at all times, and will prevent vibration or slap of the screw, while at the same time causing one wiper to cover half the ground that would have been covered by a single wiper. Furthermore, the use of non-metallic nuts does not only aid in the elimination of noise, but also prevents the setting up of vibrations in the screw during rotation.

If at any time it is desired to move the wiper arms out of direct line of vision with the occupants of the car, it is only necessary to release the nuts 31 or 72, whence the wiper arms may be moved to the position which will be approximately parallel with the housing 17.

An oscillating member 121 is pivoted at 122 and has a head adapted to be disposed between a pair of lugs 48 and 49 carried by the rod 40. As the rod is moved in opposite directions the member 121 is oscillated so that its lower end will contact with either the switch blade 124 or 125 in the casing 46.

Having thus described my invention, what I claim as new is:

In a windshield wiper, a housing, a driving screw in the housing, a plurality of spaced squeegee carriers in the housing and having openings through which the screw is threaded to move the squeegee carriers in unison between the central and end portions of the screw, said squeegee carriers being closely embraced by said housing and thereby forming constantly spaced bearings for the screw, each of which alternately approaches and supports the central portion of the screw simultaneously with the recession of the other bearing from such supporting position.

In testimony whereof I affix my signature.

JOSEPH BORNSTEIN.